United States Patent
Srikanth et al.

(10) Patent No.: US 8,199,220 B2
(45) Date of Patent: Jun. 12, 2012

(54) METHOD AND APPARATUS FOR AUTOMATIC IMAGE MANAGEMENT

(75) Inventors: Gummagatta Narayanareddy Srikanth, Karnataka (IN); Girish Kulkarni, Karnataka (IN)

(73) Assignee: Samsung Electronics Co., Ltd. (KR)

( * ) Notice: Subject to any disclaimer, the term of this patent is extended or adjusted under 35 U.S.C. 154(b) by 634 days.

(21) Appl. No.: 11/775,689

(22) Filed: Jul. 10, 2007

(65) Prior Publication Data

US 2008/0136940 A1 Jun. 12, 2008

(30) Foreign Application Priority Data

Jul. 10, 2006 (IN) .......................... 1209/CHE/2006
Dec. 6, 2006 (IN) .......................... 1209/CHE/2006
Jul. 9, 2007 (KR) .......................... 10-2007-0068878

(51) Int. Cl.
*H04N 5/76* (2006.01)
*H04N 5/225* (2006.01)
*H04N 7/173* (2011.01)
*G11B 5/09* (2006.01)

(52) U.S. Cl. ........... 348/231.99; 348/207.99; 348/231.2; 369/47.1; 725/94

(58) Field of Classification Search ............. 348/231.99, 348/207.99

See application file for complete search history.

(56) References Cited

U.S. PATENT DOCUMENTS

| 5,899,956 | A  | * | 5/1999  | Chan .............................. 701/213 |
| 7,015,941 | B2 | * | 3/2006  | Malloy Desormeaux ...... 348/64 |
| 7,432,957 | B2 | * | 10/2008 | Yokoi ......................... 348/220.1 |
| 2003/0044170 | A1 | * | 3/2003 | Haddad et al. ................. 386/124 |
| 2003/0117505 | A1 | * | 6/2003 | Sasaki et al. .............. 348/231.99 |
| 2003/0133016 | A1 | * | 7/2003 | Chan ....................... 348/207.99 |
| 2003/0174219 | A1 | * | 9/2003 | Iijima ...................... 348/231.99 |
| 2005/0078197 | A1 | * | 4/2005 | Gonzalez ................. 348/231.99 |
| 2006/0072027 | A1 | * | 4/2006 | Shibayama ............... 348/333.1 |
| 2006/0120234 | A1 |   | 6/2006 | Aono et al. |
| 2007/0040033 | A1 | * | 2/2007 | Rosenberg ............... 235/462.36 |
| 2007/0109428 | A1 | * | 5/2007 | Suzuki et al. ............ 348/231.99 |

FOREIGN PATENT DOCUMENTS

| KR | 1020010076513 | 8/2001 |
| KR | 1020020028138 | 4/2002 |
| KR | 1020050068815 | 7/2005 |
| WO | WO 2005/055585 | 6/2005 |

* cited by examiner

*Primary Examiner* — David Ometz
*Assistant Examiner* — Quang Le
(74) *Attorney, Agent, or Firm* — The Farrell Law Firm, P.C.

(57) ABSTRACT

Provided is a method and apparatus for automatic image management in an imaging device. The method and apparatus includes serially capturing and temporarily storing a predetermined number of still images in a predetermined time interval; and if the new still images are stored when all of the predetermined number of still images are stored, discarding oldest still images and temporarily storing new still images, wherein the predetermined number of newest still images are stored in real time.

21 Claims, 7 Drawing Sheets

METHOD AND APPARATUS FOR AUTOMATIC IMAGE MANAGEMENT

PRIORITY

This application claims priority under 35 U.S.C. §119(a) to an application entitled "Method And Apparatus For Automatic Image Management" filed with the Indian Intellectual Property Office on Jul. 10, 2006 and Dec. 6, 2006, and assigned Serial No. 1209/CHE/2006, and filed with the Korean Intellectual Property Office on Jul. 9, 2007, and assigned Serial No. 10-2007-0068878, the contents of which are incorporated herein by reference.

BACKGROUND OF THE INVENTION

1. Field of the Invention

The present invention relates to the field of mobile communication, and more particularly to a method and apparatus for automatic image management, in which a mobile platform with a camera function automatically manages images. The mobile phones may includes, for example, mobile phones with a camera function and smart phones and handheld devices with a camera, software desktop applications, etc.

2. Description of the Related Art

PCT patent publication No. WO/2005/055585 entitled "Camera for Recording of an Image Sequence" describes a camera that can take a picture instantly upon activating a shutter release button. This camera also includes a buffer storage storing a plurality of pictures. The plurality of pictures contains pictures taken before as well as after the traditionally taken picture. This provides the user with an option of reviewing the pictures taken at the instant of activation of the shutter release button in the plurality of pictures and selecting one or more preferred pictures to be stored in a non-volatile memory of the camera.

The above PCT Publication patent discloses a method of taking pictures with a camera, which includes taking and storing, substantially continuously, a first plurality of pictures independently of an activation of the activation means during a camera preview; taking and storing a picture (a user-selected image) in a storage means (a main memory) upon the activation of the activation means; taking and storing a second plurality of pictures (after the user-selected image) in response to the activation of the activation means; displaying the picture taken upon activation of said activation means and stored in said storage means on the display means; in response to a user input, displaying pictures from the first and second plurality of pictures on the display means; providing the user with the option to choose a picture in the first (preview images) or in the second (post-view images) plurality of pictures to be stored in the storage means; and if the user chooses a picture from the first or the second plurality of pictures to be stored in the storage means, storing the chosen picture in the storage means.

A user can operate of the camera as follows: When he/she turns on the camera so that the view finder is active, e.g. by activating a button to activate the functions of the camera, the camera begins storing a certain number of pictures, i.e. preview images with full resolution in a buffer memory, i.e. the second storage means. This preferably is a circular buffer memory, so that whenever the buffer memory is full, the oldest pictures are substituted in the memory by recent pictures. By substituting pictures in the buffer memory by newer pictures, excessive filling of the storage means can be avoided. Whenever the user activates the activation means, e.g. presses a shutter release button, a picture corresponding to a user-selected image is taken and stored in the first storage means. This picture can be shown to the user on the display of the camera, either automatically or by user demand.

Thus, the user experiences a possible "going back in time" in relation to the moment of activation of the activation means, and pictures from before the moment of activation of the activation means, as well as pictures from after the moment of activation, are stored in the camera and can be shown to the user and be kept.

The camera would continue to store for instance 25 more pictures after the activation of the activation means, so that the circular buffer stores 25 pictures from before and 25 pictures from after the activation of the activation means, whereof the pictures taken before the activation of the activation means correspond to the first plurality of pictures and the pictures taken after said activation correspond to the second plurality of pictures. The number of pictures in the first and second pluralities need not be equal. The counter value in the buffer register would contain the information of which indices correspond to which pictures as well as where the boundary in the circular buffer between pictures taken before and after activation of the activation means is to be found.

However, the described mobile platform with the camera has the following problems 1. Frequently a user has initiated a camera application to perform a picture-taking activity, video recording, etc., but sometimes there is a chance that he forgets to take a picture or forgets to Record video and close the camera (accidentally or voluntarily).

2. In the mobile platform there are many applications that make use of the camera, but the "take picture" application is the only explicit means to store a still image. The user may want to record serially the newest 'n' still images simultaneously when he is using other applications such as Video Telephony (hereinafter, "VT"), video recording, Internet Protocol (IP) Multimedia System (IMS) Video Sharing, etc.

3. In the mobile platform there are many applications that make use of the camera and the user often switches among these applications and the user cannot continue recording serially the newest 'n' Images when the user switches from one camera application to another.

4. While the user records a sequence of still images he cannot pause serially recording still images for a particular interval of time, and resume the recording later.

The user has started the camera to serially capture still images, and suddenly a VT call occurs, but the user feels that the current newest 'n' still images available in the buffer are very important and wants the still images for a later reviewing, but further does not want the images to be overwritten and still carry on with VT immediately.

5. Some times it so happens that the user feels that the currently available images in the buffer is very important to him and wants to review the newest 'n' images available in the buffer and also save the images of his choice.

6. In some cases the user does not want the current 'n' still images available in the buffer to be overwritten and wants the still images for later reviewing, i.e., the user intends to continue the camera application without stopping the camera or blocking the viewfinder. Also, the user may want to start recording a fresh set of a sequence of the "newest n" still images without interrupting the camera/viewfinder.

7. The user starts a camera preview and after sometime, e.g., after few minutes, wants to take a picture, but, unfortunately, if the battery suddenly goes down at this instant, then the picture-taking application is closed. Hence the user cannot take the picture, even though the moment to be captured is on the viewfinder, due to the low battery.

8. The user starts the camera preview and selects a multi-shot option to get next "m" still images. In a conventional technique, the user may however miss the right moment to start the multi-shot capturing and, because of this, may not get exact images he wanted.

9. It is not possible to get the newest 'n' still images when the user has initiated the camera by applications such as IMS video sharing/video telephony, video recording and simultaneously save the currently available 'n' images in the buffer during anytime the user wishes.

In the mobile platform there are many applications, which make use of the camera, but the 'take picture' application is the only explicit means to take a photograph.

SUMMARY OF THE INVENTION

Accordingly, the present invention has been made to solve the above-mentioned problems occurring in the prior art, and the present invention provides a method and system for automatic image management, in which a new application termed as "Magic Moments" is proposed, which allows the user to serially capture the newest 'n' still images with the specified number of still images with a specified time interval between two still images when the camera device is in use by any applications such as picture-taking, video-recording/video telephony, video-sharing, etc.

Also, the present invention provides a method and system for automatic image management, in which the Magic Moments application can runs in background when any such application using the camera is running and can provides series of still images whenever required.

Also, the present invention provides a method and system for automatic image management, which allows the user to continue capturing images even if the user switches from one camera application to other except for the small time interval if the camera needs to be switched off and on automatically.

Also, the present invention provides a method and system for automatic image management, which can provide a means to pause and resume the recording serially pictures dynamically for the efficient use of memory and a duration of the newest 'n' images. This also helps to stay him longer in past.

Also, the present invention provides a method and system for automatic image management, which allows the user to capture some moments in the form of a series of the newest 'n' still images during all circumstances where the camera is active and the user is able to get the series of the newest 'n' still images at any instant during the entire life the camera is active.

Also, the present invention provides a method and system for automatic image management, in which the user can store the newest 'n' images at a particular time instant, and also can store a different set of newest 'n' images with reference to next point in terms of time without interruption of the camera multiple times as long as the camera is turned on, which is also available at several time points.

Also, the present invention provides a method and system for automatic image management, which allows the user to change the time interval between images and number of images dynamically depending on the situation.

Also, the present invention provides a method and system for automatic image management, which helps the user not to miss any important event while the camera is active. That the camera is active means that the user is able to watch whatever the camera sees on the display screen.

In accordance with an aspect of present invention, there is provided a method for automatic image management in an imaging device which includes serially capturing and storing temporarily a predetermined number of still images in a predetermined time interval; and discarding oldest still images and temporarily storing new still images if the new still images are stored when all of the predetermined number of still images are stored, wherein the predetermined number of newest still images are stored in real time.

It is preferable that the method further includes pausing the serially storing of still images if a pausing request is generated, and resuming the serially storing of still images if a resuming request is generated.

It is preferable that the method further includes normally storing the temporarily stored predetermined number of still images if a freezing request is generated.

The application of the present invention for automatic image management has a mechanism to buffer the newest frame captured by the camera.

The Magic Moments application can capture a subject for photograph, temporarily store serially a predetermined number of still images, and store the temporarily stored predetermined number of still images in response to a final request for storing.

The Magic Moments application according to the present invention provides the newest 'n' camera frames as still images with time interval of "t" between two still images adjacent to each other anytime. The format of the still images, the number of frames 'n' and time interval between two images "t" can be configured by the user. The time interval "t" is the time interval between time instants of photographing (time instants of capturing) two still images adjacent to each other among the serially captured still images, and is not a camera capture or preview rate.

This present invention further relates to a method and system for automatic image management in an imaging device, in which 'n' number of frames are recorded and stored in a buffer as still images with a time interval of "t" between any two adjacent still images dynamically; where at any point of time when the device receives a new frame, the oldest frame stored in the buffer is discarded and replaced by the new frame received.

The imaging device is adapted to pause the recording of frames dynamically. The imaging device is also adapted to resume the recording of frames dynamically. The device is adapted to freeze the newest 'n' frames at any particular time instant for later reviewing and start with fresh/new set of newest 'n' still images. The device keeps the series of the newest 'n' still images intact stored in the buffer when the user switches among different camera applications. The method further involves encoding the still images depending on user settings. The number of frames 'n' and the time interval between two images "t" are dynamically configurable as well. For viewing the content, the imaging device provides the newest 'n' still images in the buffer in addition to the frame taken by a user at any moment to make the total number of frames "n+1". The buffer size can be dynamically varied. The content of the buffer can be frozen by the user at any moment and a new buffer with fresh set of newest 'n' still images can be created. Later, at any moment the user can view the present contents of the buffer in addition to the contents of the buffer preciously frozen during the newest freeze operations performed. The user can select all of the frames or a subset of the frames shown while viewing the buffer content. Frames captured by the imaging device are adapted to undergo compression before storing into storage. The user can a set start-and-stop the automatic image management option according to the Magic Moments application for a particular period when any other image application is active. The user can select plurality of image formats for storing the frames. A multi-shot option in the imaging device can be activated to capture "m" frames enabling the user to get the newest 'n' frames previous stored in the buffer before multi-shot and next "m" frames due to multi-shot providing the user with "n+m" frames to choose from. At any instance of time when the imaging feature in the device being terminated the imaging device provides the newest 'n' still images stored in the buffer together with previously stored still images.

This present invention also provides a system for automatic image management in an imaging device which included (a) means for storing 'n' number of frames; (b) means for controlling the enabling and disabling of the image management and capturing of the frames; (c) means for providing user inputs; and (d) an image process unit to process the captured images.

The controlling means captures the frames provided by the camera process unit after regular time interval "t". An image encoder encodes the captured frame in still image format set by a user. The imaging device includes a means for pausing and resuming the recording of frames dynamically. The imaging device includes a means for freezing and selecting the newest 'n' frames at any particular time instant for later reviewing and storing. The imaging device also includes a means for compressing the captured frames. The imaging device also includes a means for capturing "m" frames enabling the user to get the newest 'n' frames previously stored and next "m" frames providing the user with "n+m" frames to choose from.

These and other objects, features and advantages of the present invention will become more apparent from the ensuing detailed description of the present invention taken in conjunction with the accompanying drawings.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE EXEMPLARY EMBODIMENTS

The preferred embodiments of the present invention will now be explained with reference to the accompanying drawings. It should be understood however that the disclosed embodiments are merely exemplary of the invention, which may be embodied in various forms. The following description and drawings are not to be construed as limiting the invention and numerous specific details are described to provide a thorough understanding of the present invention, as the basis for the claims and as a basis for teaching one skilled in the art how to make and/or use the invention. However in certain instances, well-known or conventional details are not described in order not to unnecessarily obscure the present invention in detail.

A user often initiates a camera application to perform picture-taking activity, video recording, etc. but sometimes there is a chance that he forgets to take a picture or forgets to record video and closes the camera (accidentally or voluntarily). But by using Magic Moments, the present invention serially records the newest 'n' still images during all circumstances when the camera is turned on at any instant of time, therefore the user is able to get the series of newest 'n' still images.

In a mobile platform there are many applications that make use of the camera, but the 'take picture' application was the only explicit means to store a still image.

Often, when the user records a particular event in a video, the user later feels that recording the event is of less importance or may find that recorded video is occupying more memory and the user is running out of memory. Hence the user wishes he could have taken few images of that event which would have been sufficient rather than a complete video. But since the user is recording, he can't simultaneously take the pictures. In conventional technique, the user has to edit the video into small clips or extract images, which is a cumbersome activity.

Also, the user is often interested in recording a lengthy event and also wishes to simultaneously capture a series of still images of the same event, so that he can send at least images (video is lengthy and is difficult to send over a network) to his friends as messaging service, e.g., Enhanced Messaging Service (EMS) or Multimedia Messaging Service (MMS).

Also, the above situation often occurs when the user performs video telephony, IMS video sharing, etc. and wishes to store series of still images of the same.

The Magic Moments application according to the present invention satisfies the aforementioned desire of the user, which allows the user to capture a series of still images with a specified number with a specified time interval between two still images adjacent to each other when the camera device is in use by any application such as picture-taking, video recording, video telephony, video-sharing, etc.

When there is a camera in a mobile platform, there are also many applications that make use of a camera and the user often switches among these applications. In this case, the user would like to continue recording serially the newest 'n' still Images even when the user switches from one camera application to another. The Magic Moments application manages to continue capturing still images even if the user switches from one camera application to other, except for the small time interval if the camera needs to be switched off and on automatically by keeping the buffer (consisting of a series of newest 'n' still Images) intact.

The user has started the camera with the intention of taking a picture, and later feels that he should start recording video and switches to a video-recording application, but wishes to keep the newest 'n' images stored in buffer intact and continue the same buffer during video-recording, as well.

The Magic Moments application provides a means to "pause" and "resume" the recording serially the pictures dynamically for the efficient use of memory and also dynamically the duration of the newest 'n' images. This helps the user in saving older images, while using less memory.

If the user has started the camera application, after sometime feels that the images currently available in the buffer are more meaningful/important than the coming frames to be captured later or after having recorded newest 'n' meaningful frames the user is not interested in storing next frames for a particular time interval. Since there is possibility that upcoming frames yet to be captured will overwrite the existing frames in the buffer or may unnecessarily occupy space in buffer, providing the user with a function to pause and resume helps to avoid overwriting the buffer with unwanted camera frames. The advantage is that he can save older images for a longer time interval. In effect, redundant images, i.e., still images, are not stored in the buffer, thus the existing memory is used efficiently by the user himself.

Since the mobile platform has many applications that use the camera and the user often switches from one camera application to another camera application, e.g., the user has started the camera to capture series of still images, suddenly VT call happens, but the user feels that the current newest 'n' still images currently stored in the buffer are very important and wants the still images for later reviewing, but does not want the still images to be overwritten and still carry on with VT immediately. In such situations the user can simply pause the Magic Moments application and later when the call is finished he can continue capturing the series of still images or review the images stored in the buffer before the VT call.

The Magic Moments application allows the user to freeze/select the newest 'n' images corresponding to any particular time instant for later reviewing stored in volatile memory or permanently stored in nonvolatile memory such as flash, Read Only Memory (ROM), etc. and allows the user to continue with a fresh set of newest 'n' images without breaking the continuity i.e. without blocking the view finder or stopping the camera, multiple times, as long as the camera is turned on.

For example, in a case where the user is watching a football match, whenever he feels the moments he is viewing are important, he can freeze the newest 'n' images stored in the buffer for later reviewing stored in volatile memory or permanently stored in nonvolatile memory such as flash, ROM, etc. that are available in the buffer without breaking the continuity of the camera viewfinder and go on with a fresh set of newest 'n' images.

Sometimes the user feels that the currently available still images stored in the buffer are very important to him and he wants to review the newest 'n' images stored in the buffer also save the images of his choice. Note that the user's intention is not to take a picture.

Often, the user suddenly witnesses an event of his interest and starts the camera to take a picture immediately, luckily the user also finds the event on the viewfinder, but unfortunately the event that the user wants to capture has vanished before he could initiate the picture-taking activity. This is a case where in the user sees the event on the viewfinder but before he could click the button to take a picture the moment vanishes.

The user starts a camera preview and after sometime, e.g., after few minutes, feels that the current moment is the right moment and wants to take a picture, but unfortunately if the battery drains suddenly at this instant, then picture-taking application is closed. Hence the user cannot take the picture, even though the moment to be captured is on the viewfinder, due to the low battery. The Magic Moments application also has a mechanism to buffer the newest frame at the time of closing the camera application captured by the camera in order to tackle the case wherein the required frame to be captured is on the view finder, but before the user could initiate the picture-taking application, the application is closed accidentally, due to a low battery, the camera application is terminated automatically, also instead of activating the key designated to initiate take picture the user can press by mistake a key designated to terminate the application, or the application is voluntarily closed, in addition to the newest 'n' frames also newest frame at the time of closing the application captured by the camera is buffered. Thus the user is readily available with the newest 'n' still images as well as the newest image captured by the camera when the application accidentally closes.

If the user starts the camera preview and takes a picture, but does not obtain a "good or quality" picture due to reasons such as improper focusing, a moving object, camera-shaking, etc., or he is unsatisfied with the picture, it is impossible to go back in time, so the user misses important and precious moments. But as the Magic Moments application provides the newest 'n' still images in addition to the image taken by the user, it is possible to get the images of missed events and therefore the user can select a best picture out of "n+1" (the newest 'n'+the image normally taken by the user) images. The Magic Moments application also can be considered as a "past multi-shot" in order to get a best picture out of many.

The user may start the camera preview and takes a picture, while some obstacle comes in front of the camera sensor. Obstacles can be in the form of people or objects accidentally coming in front of the camera, or the finger of the person taking the picture can come in front of the camera.

Therefore, the user will not get a proper image, but if the user later feels that he should have taken images of those moments at least as a "token of remembrance" of the occasion, it is impossible to go back in time, so the user misses important and precious moments. But as the Magic Moments application provides the newest 'n' still images in addition to the image taken by the user, it is possible to get the images of missed events and therefore the user can select a best picture out of "n+1" (the newest 'n'+the image normally taken by the user) images.

If the user starts the camera preview with an intention of taking a picture and forgets to take a picture or misses the right moment to take a picture, but later feels that he should have taken images of those moments at least as a "token of remembrance" of the occasion, it is impossible to go back in time, so the user misses important and precious moments. But as the "Magic Moments" application provides the newest 'n' still images at any point of time, it is possible to get the images of missed events even during a camera preview and without taking actual picture at any time. It is possible to get the newest 'n' still images any time as long as the camera is turned on and even multiple times if the camera is turned on.

If the user starts the camera preview and selects a "multi-shot" option to get next "m" images, the user may miss the right moment to start the "multi-shot" capturing and because of this may not get the exact images he wanted. The "Magic Moments" application is disabled automatically during a multi-shot and will get enabled after the multi-shot. Because of this, the user will get the newest 'n' images previous to multi-shot (before multi-shot) and next "m" images due to the multi-shot. Therefore, it is possible to get the images of missed events and therefore the user can select a best picture out of "n+m" ("m" multi-shot+the newest 'n' before multi-shot) images.

The newest 'n' number of images and the time interval between two images is configurable/programmable by the user.

The Magic Moments application does not alter or change the camera frames per second, i.e. a shutter speed related to normal photographing set by the application that uses the camera. The shutter speed works independently and the imaging device captures the frame from the camera with an interval set by the user to encode frames in the format specified by the user. This restricts the time interval of Magic Moments images that the time interval should be equal to or greater than the camera capture time interval.

It is possible to get the newest 'n' still images during any application that uses the camera.

The user can get the newest 'n' still images until the point the user closes the camera or any application that uses the camera and the user can view the same images at any point of time when the camera is turned on or even after closing the camera application also.

Whenever the user takes a picture, "Magic Moments" application provides the number of the 'n' of still images, i.e. the newest 'n' images along with the image taken by the user. The user can save any or all images as he desires.

In all cases the user can save or delete any or all images provided by "Magic Moments" application.

There is an option to enable/disable the Magic Moments application.

"Magic Moments" is an application where the newest 'n' camera frames will be readily available as still images (snaps) at instant. The user can select the image format of his own choice such as Joint Photographic Experts Group (JPEG), JPEG2000, MultiResolution Seamless Image Database (Mr-SID), Portable Network Graphics (PNG), Still Picture Interchange File Format (SPIFF), Scalable Vector Graphics (SVG), TGA, Tagged Image File Format (TIFF), Graphics Interchange Format (GIF), Digital NeGative (DNG), Cartesian Perceptual Compression (CPC), etc. The concept can be extended to any image format if codec support is available. During the time of recording, the camera frames obtained are compressed and stored in the buffer.

Figure 1:
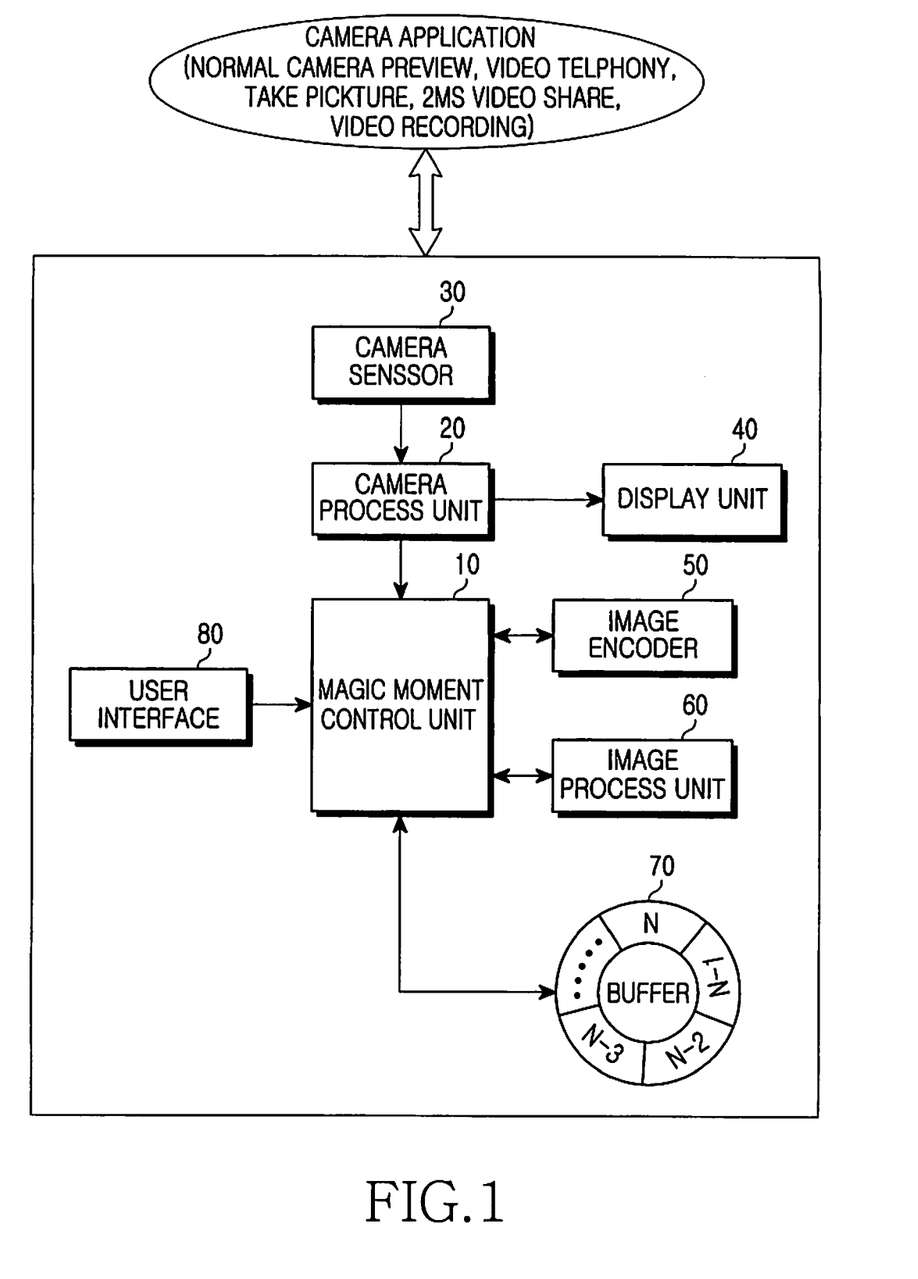
FIG. 1 is a view illustrating a configuration of an imaging device according to an embodiment of the present invention.

The following are required for implementation of the invention:
  A mobile terminal or any handheld device or PC with a camera function
  Software/hardware to encode camera frames to the format specified by the user
  A Central Processing Unit (CPU) to control and meet the real time constraint of application
  A display unit An imaging device such as a handheld device with a camera function according to an embodiment of the present invention is shown in FIG. 1. Referring to FIG. 1, the imaging device according to an embodiment of the present invention includes a Magic Moment control unit 10, a camera process unit 20, a camera sensor 30, a display unit 40, an image encoder 50, an image process unit 60, a buffer 70, a user interface 80, and a memory unit (not shown).

The Magic Moment control unit 10 stores the newest 'n' images in the buffer 70, wherein the buffer 70 is a volatile memory such as Random Access Memory (RAM), etc. This buffer is different from the buffer that is used for take picture/Multi-shot applications.

The buffer 70 is maintained in a cyclic manner such as a First-In First-Out (FIFO).

Whenever any application that makes use of the camera such as video telephony, video-sharing, video-recording, picture-taking, etc. (camera turned on) is running, the Magic Moment control unit 10 checks the enable/disable status. If the Magic Moments application is in enabled state, depending on the time interval "t" set by the user, Magic Moment control unit 10 captures the frame provided by the camera process unit 20 after regular interval "t".

The Magic Moment control unit 10, with the help of the image encoder 50, encodes, through the encoder 50, the captured frame in still image format set by the user, and stores encoded frame in a Magic Moment circular buffer 70 as shown in FIG. 1. This encoding is not mandatory, but a trade off between the performance and memory utilization. Encoding can be skipped if better performance is required, but encoding is necessary if better memory utilization is required. Encoding also depends on the user input setting, i.e., time interval 't'.

Initially the Magic Moment control unit 10 stores first 'n' encoded frames in the buffer 70 and after that, whenever the control unit 10 receives an encoded frame, the control unit 10 discards the oldest frame and replaces it with the received frame. Because of this technique "Magic Moments" application always has the newest 'n' frames at any point of time and the newest 'n' frames are updated after an interval "t" set by the user.

Whenever the user wants to see the newest 'n' frames at any point of time, the Magic Moment control unit 10 shows 'n' frames available in the circular buffer 70 in required the format on display unit 40.

Suitable means (i.e., the user interface 80) are provided for the user to dynamically change the user input setting (i.e., the number of images to be buffered 'n' and the time interval between two images 't'). Depending on this information the application readjusts the buffer 70 size and time interval dynamically. There may be a limitation on this setting depending on the hardware/memory resource limitation and also depends on the resolution of the captured image. Hence a mechanism exists which makes a check whether the number of images and time interval between the two images is realistic are not. For example, consider a camera XYZ whose capability is 5 Frames Per Second (FPS), if the user initially has configured Magic Moments with 'n' as 15 and time interval 't' as 400 milliseconds.

The user is allowed to change the time interval 't' dynamically with an increase or decrease in steps of approximately 100 milliseconds on a key press. If the user dynamically wants to decrease the time interval and presses the hotkey thrice (i.e., intends to change 't' to 100 milliseconds), this setting is not acceptable, because with a 5 FPS camera a frame once in 200 millisecond will result, hence the minimum time interval 't' possible with such a camera XYZ is 200 milliseconds.

The same applies to the number of images, which depends on the amount volatile memory including the buffer 70.

When the user takes a picture using the camera application, the Magic Moment control unit 10 de-activates the "Magic Moments" application during that time temporarily and re-activates after taking a picture. Suitable means, e.g., the user interface 80 and the display unit 40, are provided for the user to view the current image taken by the user and the newest 'n' frames captured by the Magic Moments application previous to current image. The user can select all the images or a subset of images available in the buffer 70 along with the current image taken by the user.

Similarly, when the user takes a picture using multi-shot feature of the camera application, the Magic Moment control unit 10 de-activates "Magic Moments" application during that time temporarily and re-activates after multi-shot is over.

Due to this situation, it is possible to provide "m" images taken by the user during multi-shot and the newest 'n' frames captured by Magic moments application before multi-shot started. Due to the de-activation of the "Magic Moment" application during the picture-taking scenario for a single shot and for a multi-shot (series capture), the performance and original functionality of the picture-taking scenario remains unaffected and the user gets actual images taken by him as well as the newest 'n' images just before the actual images. Suitable means are provided for the user to view the 'm' images taken by the user via multi-shot and the newest 'n' frames captured by the Magic Moments application's previous multi-shot activation. The user can select all the images or a subset of the images available in the buffer 70 along with the multi-shot images taken by the user.

Depending on the image format set by the user, the Magic Moment control unit 10 provides the newest 'n' images in the required format whenever the user desires.

In a mobile platform, the user often switches from one camera application to another camera application, the Magic Moment control unit 10 keeps the buffer's 70 contents intact during this switch, i.e., the Magic Moment control unit 10 does not destroy the buffer contents during the switch.

Suitable means is provided for the user to pause and resume (on a key press) the recording of sequence of images consisting of the newest 'n' images captured by the Magic Moments application. So whenever the Magic Moments application is paused by the user, the application goes to a sleep state until resumed again by the user. During this sleep the state buffer 70 contents are not updated.

Suitable means, e.g., a particular key, are provided, through the user interface 80, for the user to view the contents of the buffer 70 at any point of time. When the user wants to view the contents of the buffer 70, i.e., the newest 'n' images, the user views the newest 'n' images temporarily stored, along with the images normally stored by the user through the select/freeze option. The user can select all the images or a subset of the images shown to him.

Suitable means are provided for the user to freeze/select (on a key press) the contents of the circular buffer 70 at any point of time, multiple times, without disturbing the camera viewfinder. Each time the user selects the freeze option, the Magic Moment control unit 10, according to the Magic Moments application, will preserve the buffer 70 contents by creating a new circular buffer 70 used for further capturing frames in a FIFO manner. Also, each time the user freezes, buffer 70 contents can be saved onto flash memory without disturbing the camera viewfinder and make the contents available to the user for later reviewing whenever required. Here, it is noted that the term "store" means refers to still images to be stored in the buffer 70 and a term "normal store" means that still images, which have been stored in the buffer 70 by the freeze operation, are to be stored in a different memory means such as a flash memory, for example.

The user inputs to the Magic Moments application are the number of images 'n' and the time interval 't' (time interval between two images). 'N' can have any value, but is restricted by the resolution of the picture and volatile memory available. 'T' can be in milliseconds and dependent on the camera FPS.

Figure 2A:
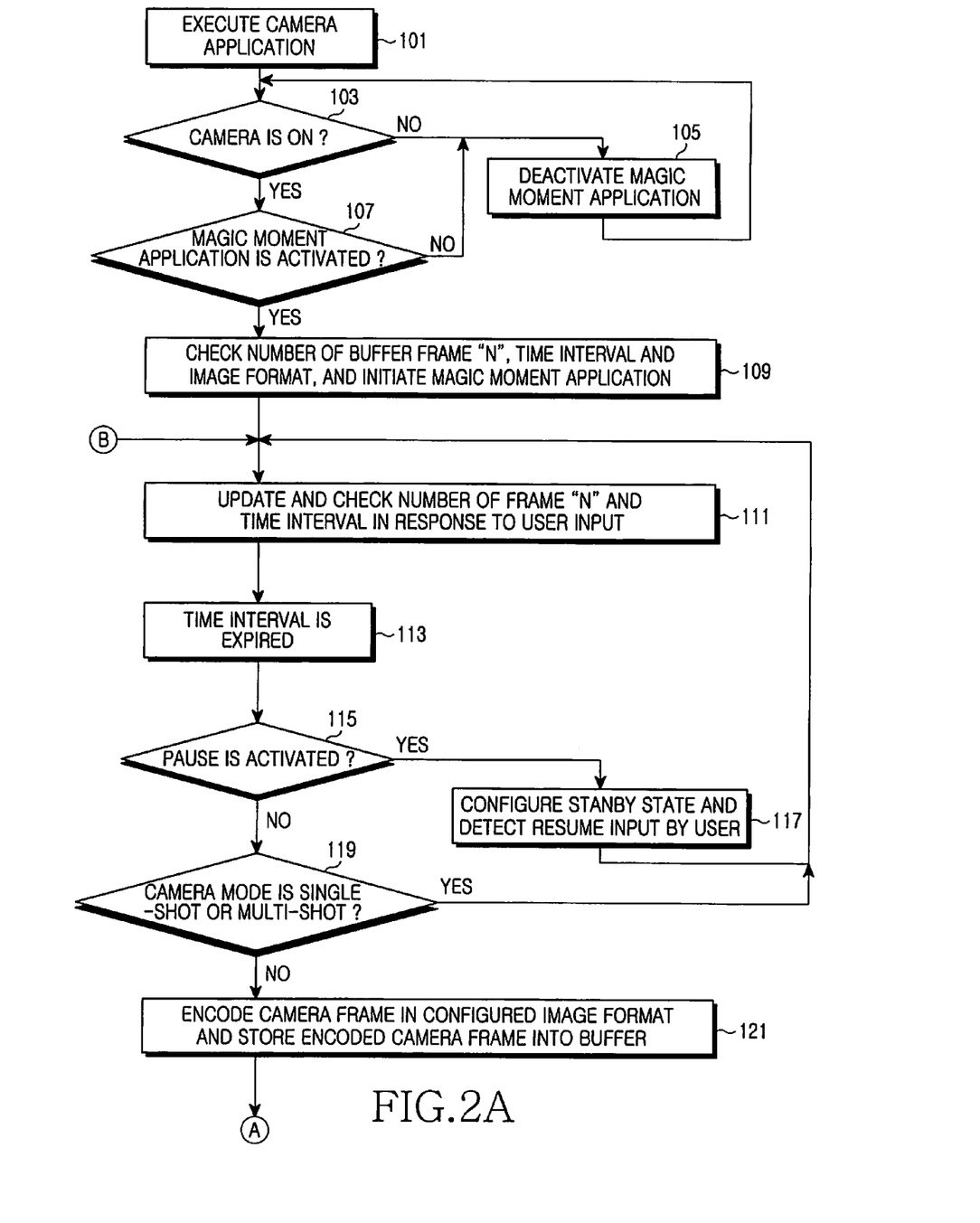
FIGS. 2A and 2B are views illustrating an operation procedure of an imaging device according to an embodiment of the present invention.
Figure 2B:
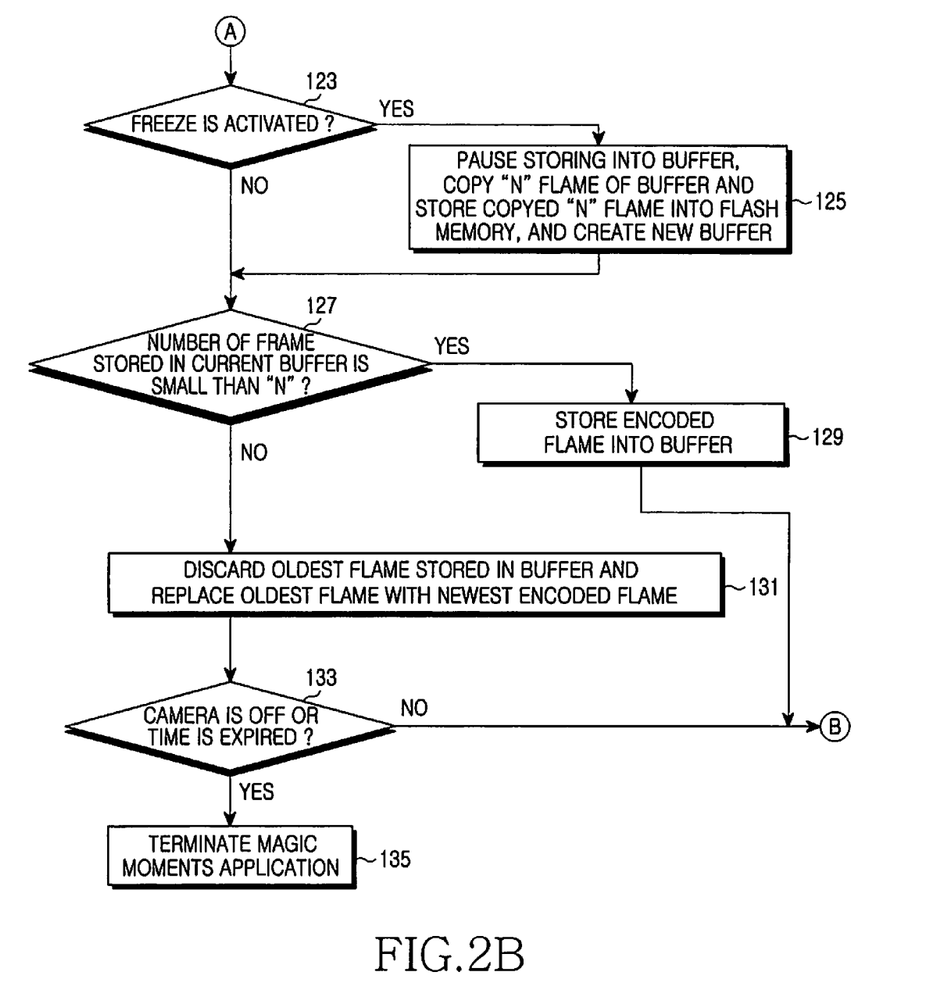

The operation procedure of the imaging device according to the present invention is explained below with reference to FIGS. 2A and 2B. In step 101, the Magic Moment control unit 10 activates the camera application and proceeds to step 103. In step 103, the Magic Moment control unit 10 determines whether the camera is "on". Thus, if the camera is "on", the Magic Moment control unit 10 proceeds to step 107. If the camera is not "on", the Magic Moment control unit 10 proceeds to step 105 to deactivate the Magic Moments application and then proceeds to step 103. In step 107, the Magic Moment control unit 10 proceeds to step 109 if the Magic Moments application is activated. In step 109, the Magic Moment control unit 10 identifies the number of the buffer frames 'n', the time interval "t", the image format, initiates the Magic Moments application, and then proceeds to step 111. In step 111, the Magic Moment control unit 10 updates and checks the number of the images 'n' and the time interval "t" according to input of the user and proceeds to step 113. In step 113, if the time interval "t" is expired, the Magic Moment control unit 10 captures still images according to the Magic Moments application and determines whether the captured still images are to be stored in the buffer 70, i.e., the Magic Moment control unit 10 identifies whether the pausing is activated in step 115. If the pausing is activated, the Magic Moment control unit 10 proceeds to step 117 and sets a standby state. Thereafter, the Magic Moment control unit 10 detects the resuming request input by the user and proceeds to step 111.

Meanwhile, if the pausing is not activated, the Magic Moment control unit 10 identifies whether the camera mode is the single-shot mode or the multi-shot mode in step 119, i.e., if any of the two modes is activated, the Magic Moment control unit 10 maintains the standby state without storing the camera frame in the buffer 70. But, if the current mode is not in the single-shot or multi-shot mode, the Magic Moment control unit 10 proceeds to step 121, and the Magic Moment control unit 10 encodes the camera frames in a configured format and stores the encoded camera frame in the buffer 70 in step 121 and proceeds to A. Thereafter, the Magic Moment control unit 10 checks whether freezing is requested in step 123. If a freezing request is generated, the Magic Moment control unit 10, in step 125, pauses storing into the buffer 17 and copies the 'n' images from the buffer 70 and stores the 'n' images in the flash memory so as to create a new buffer and proceeds to step 127. Meanwhile, if the freezing request is not generated, the Magic Moment control unit 10 checks whether a number of the frames stored in the buffer is smaller than 'n', in step 127. If the number of the frames stored in the buffer is small than 'n', the Magic Moment control unit 10 proceeds to step 129. In step 129, the Magic Moment control unit 10 stores the encoded frames in the circular buffer and proceeds to B so as to proceeds said step 111. Also, if the number of the frame stored in the buffer is greater than or equal to 'n' in step 127, the Magic Moment control unit 10 proceeds step 131. In step 131, the Magic Moment control unit 10 discards and replaces the oldest frames among the frames stored in the buffer 70 with the newest frames. In step 133, if the camera is switched "off" or time 't' has expired, the Magic Moment control unit 10 proceeds to step 135. In step 135, the Magic Moment control unit 10 terminates the Magic Moments application. If the camera is "on" and the time 't' has not expired, the Magic Moment control unit 10 proceeds to B.

Hereinafter, some scenarios according to an embodiment of the present invention will be explained with reference to FIG. 3 to 6.

Figure 3:
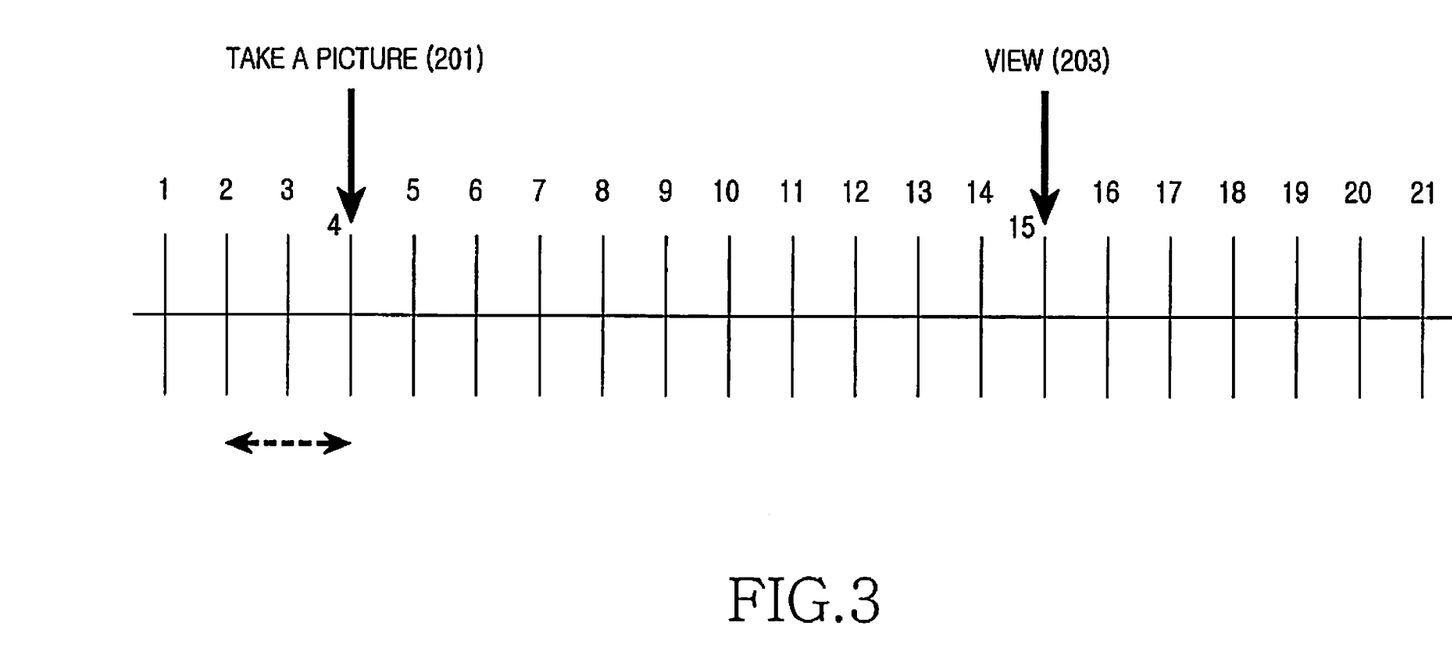
FIGS. 3 to 6 are views illustrating operation scenarios according to an embodiment of the present invention.

Assume that the user has configured the time interval (time interval between two images adjacent to each other, to be stored in the buffer 70) 't' as 1 second and 'n' the number of images as "2" to be stored according to the Magic Moments application. Referring to FIG. 3, with this setting if the user presses a key to take a picture at $4^{th}$ second in step 201. Then the user is readily available with an image captured at the $2^{nd}$ second, an image captured at the $3^{rd}$ second, plus an image taken by the user at the $4^{th}$ second. In the Magic Moments application the user does not need to take a picture, and at any instant of time he can (via a hot key) review the contents of buffer 70. In this scenario if the user, as in step 203, intends to view the contents of buffer 70 at 15th second, then the user retrieves images captured at the $15^{th}$ second and the $14^{th}$ second.

Figure 4:
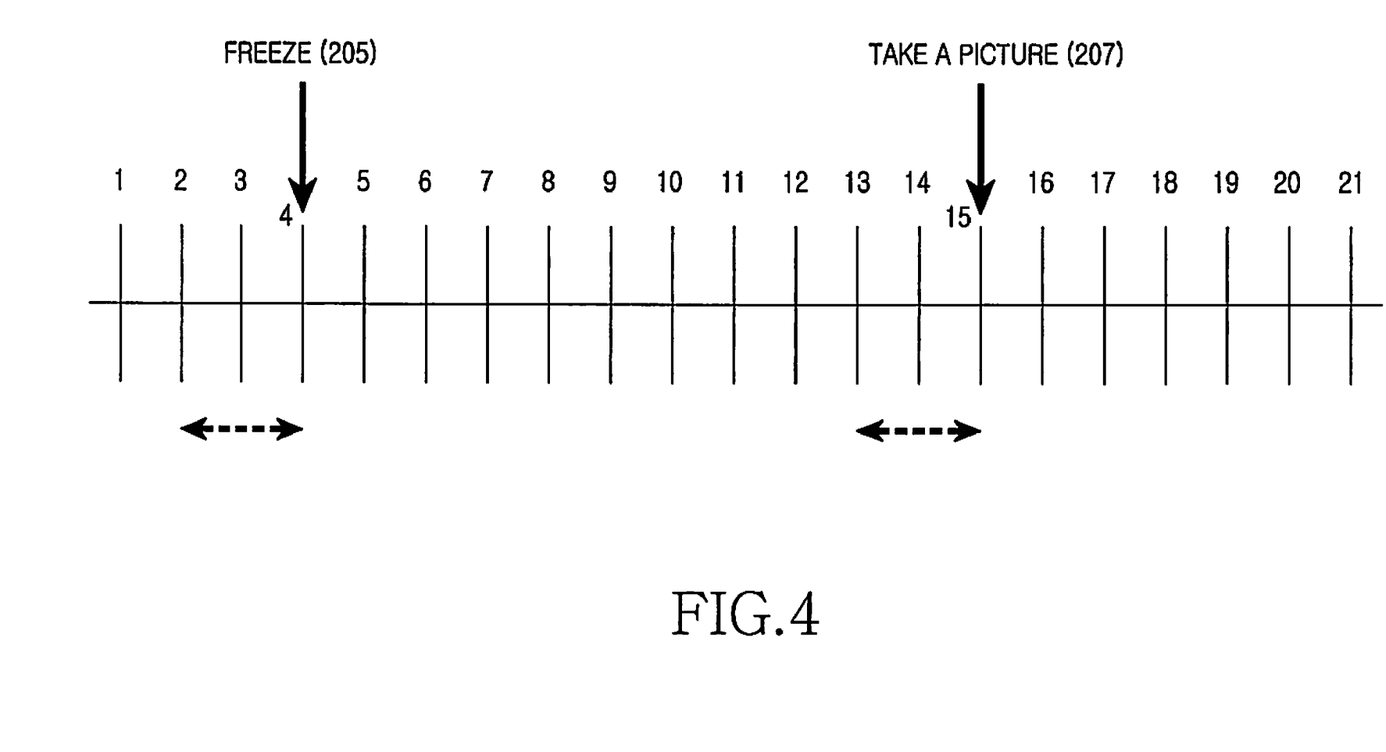

Assume, for this example, that the user has configured the time interval (time interval between two images) 't' as 1 second and 'n' the no of images to be captured as "2". Referring to FIG. 4, with this setting at the $4^{th}$ second, the user can press select/request the freezing operation, indicating to the Magic Moments application that the user is interested in reviewing the buffer 70 contents at a later point in time. With this operation, the buffer 70 contents, i.e., the still image captured at the $3^{rd}$ and $4^{th}$ seconds are preserved for later reviewing. And the user requests, as shown in FIG. 4, a picture of the single-shot at 15$^{th}$ second in step 207. Then the user is readily available with the 3$^{rd}$ image and the 4$^{th}$ image as well as the 13$^{th}$, 14$^{th}$, and 15$^{th}$ images. The major advantage here is avoiding overwriting of the buffer contents whenever the user is interested in the contents of buffer 70 at a particular moment.

The Magic Moments application further provides the pause and resume feature. With the help of this feature, the user can keep the buffer 70 intact by not overwriting the buffer 70 whenever he feels the camera sees something, i.e., of little importance. Thus the Magic Moments application allows the user to use the buffer 70 efficiently.

The imaging device has many applications that use the camera, and thus the user often switches among these applications to take a picture.

An operation of the Magic Moments application when the camera applications are switched will be explained with reference to FIG. 5, in which it is assumed that the user has configured the number of the newest still images 'n' as 10 and the time interval 't' as 1 sec.

Figure 5:
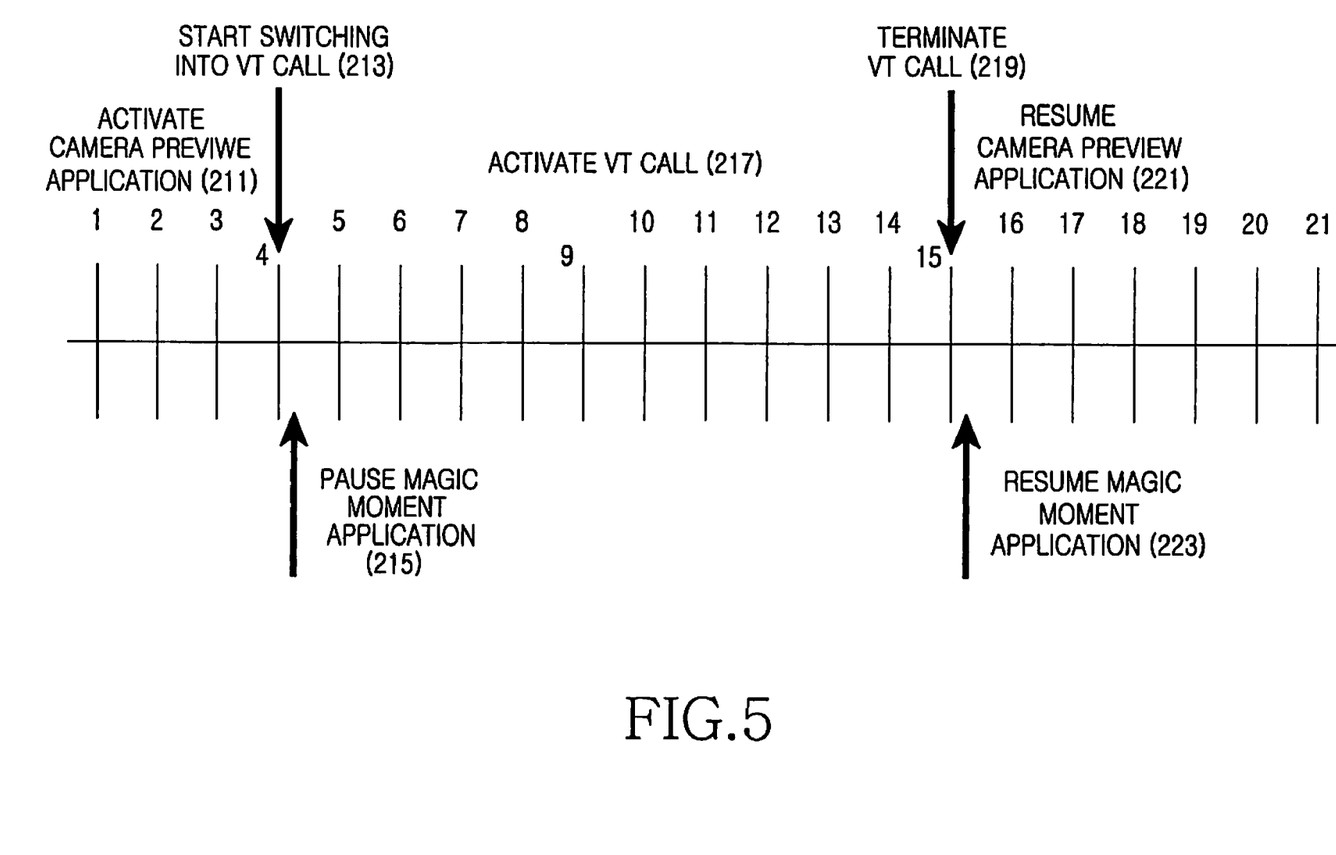

Referring to FIG. 5, in step 211, the user has started the camera preview application with an intention of storing the newest 'n' frames and after few seconds the user gets a VT call which he wants to answer in step 213. But the user feels the contents of the buffer (the newest 'n' frames) before the VT call are important to him and hence does not want the contents to be overwritten by what the camera sees during the VT call, and also wants the buffer 70 to be intact during the small interval of switching from the camera preview application to the VT application. In such a case the user can pause the Magic Moments application in step 215 and carry on with the VT call in step 217. Pausing the Magic Moments application ensures that whatever the camera viewfinder sees at the time of the VT call is not pushed into the buffer once the VT call is over again in step 219, when the user wishes to switch back to the camera preview application. Then the user can resume the Magic Moments application in step 223 and at the 21$^{st}$ second the contents of the buffer 70 will be still images recorded at the 1$^{st}$, 2$^{nd}$, 3$^{rd}$, 4$^{th}$, 16$^{th}$, 17$^{th}$, 18$^{th}$, 19$^{th}$, 20$^{th}$, and 21$^{st}$ seconds. This shows that the buffer 70 is used efficiently and thus the user is able to preserve images for a longer time interval.

Figure 6:
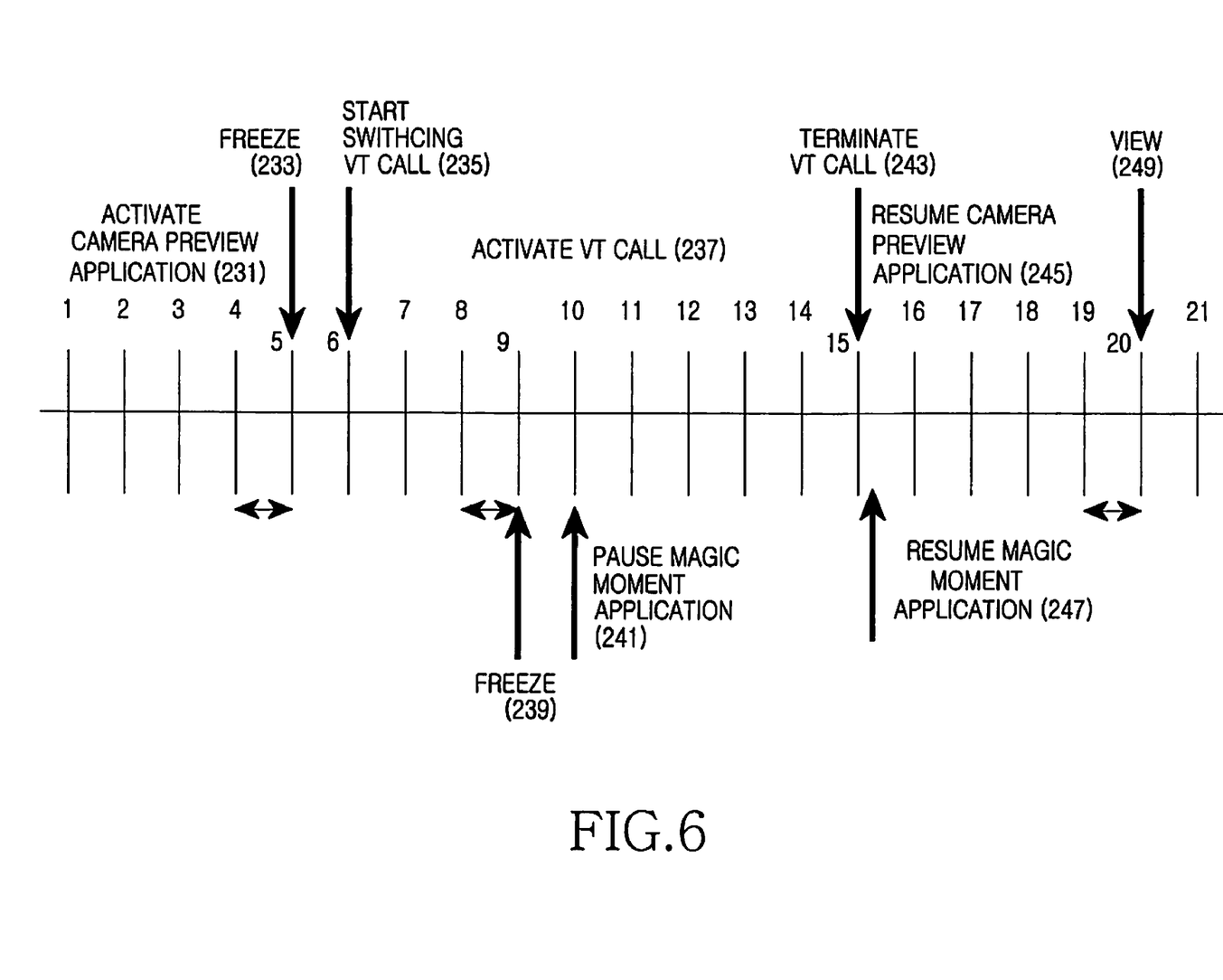

Referring to FIG. 6, the operation of the Magic Moments application according to the present invention will be explained, wherein it is assumed that the user has configured the time interval (time interval between two images) 't' as 1 second and 'n' the number of images as "2".

In step 231, the user has started the camera application with the intention of taking a picture and has activated the camera preview application.

Now, after few seconds, the user gets a VT call.

But at this point of time, the user is interested in the contents of the buffer at the 5$^{th}$ second, in step 233, so the user applies the freeze option, i.e., the user requests the preservation of the contents of the buffer 70 for later reviewing.

The user attends the VT call in step 235, and thus the VT call is activated in step 237.

Again during the VT calls, the user is also interested in the contents of the buffer at the 9$^{th}$ second in step 239, so he requests the freezing operation. Accordingly, the imaging device preserves the contents of the buffer for later reviewing.

Thereafter, the user is not interested in recording the sequence of still images during the VT call from the 10$^{th}$ second in step 241, so he pauses the Magic Moments application in step 241.

Once VT call is done in step 243, the camera preview application is resumed in step 245, and the user resumes the Magic Moments application in step 247 and wants to view the contents of the buffer 70 at the 20$^{th}$ second.

At this instant, the user gets the images recorded at the 4$^{th}$, 5$^{th}$, 8$^{th}$, 9$^{th}$, 19$^{th}$, and 20$^{th}$ seconds.

The above scenarios explain how the freeze, pause/resume and view options provided by the Magic Moments application can be used. With the freeze option the user is able to get the images recorded at the 4$^{th}$ and 5$^{th}$ seconds. At this time, it is appreciated that the user has swiftly switched from one camera application to another camera application, but has still retained images recorded back in time.

Suitably the user is provided with a set of keys to execute the freeze, pause and resume, and view options, which are included in the user interface 80. Dynamically changing the time interval 't' (time interval between two images) and the number of images 'n' can be realized by incremental or decremental steps of units via a key press.

Whenever the user wants to view the contents of the buffer 70, the user is shown the newest 'n' images, along with the images normally taken and preserved by him using the select/freeze option. The user can select all the images or a subset of images shown to him by navigating the contents.

In case the user closes the camera application voluntarily or accidentally, the user is shown the newest 'n' images plus the newest frame captured by the camera, along with also the images preserved by him using the select/freeze option. The user can select all the images or a subset of images shown to him by navigating the contents.

A low-battery with respect to the Magic Moments application should be interpreted in as follows: The mobile platforms with imaging devices according to the present invention require more battery power to start multimedia applications that involve the camera. Thus if a sufficient amount of battery power is not available, generally the corresponding application is closed automatically. This does not mean that the mobile platforms cannot be used for other purposes such as viewing a call list, setting an alarm, etc. The user is provided a mechanism wherein he can save the contents of the buffer, in such scenarios, as explained in the above paragraph.

As the Magic Moments application is executed in the background, it is active across multiple applications that make use of the camera, except for a small time interval if the camera needs to be switched off and on automatically, without switching off the mobile phone by keeping the buffer 70 containing the newest 'n' images serially stored therein intact.

In the Magic Moments application, it is possible to repeat the freeze/view options successively/quick succession, and care is taken to number the images in accordance with the time of freezing/selecting. The number of the freeze operations possible depends on the available memory in the system.

There is an option to get the newest 'n' images as a slide show. Images of the newest 'n' images are suitable for slideshow as they are in sequence, and the user can feel the continuous effect.

A suitable means is provided to disable/enable the Magic Moments application via the user interface. The user can set a start and a stop time to enable this option.

The Magic Moments application is summarized in the following manner: This new application allows the user to serially capture the newest 'n' still images with the specified number of still images with the specified time interval between two still images when the camera device is in use by any application such as picture-taking, video-recording, video telephony, video-sharing, etc. The Magic Moments application runs in the background when any such application using the camera is running, and provides the serial still images whenever required. The Magic Moments application also manages to continue capturing images even if the user switches from one camera application to other, except for a small time interval if the camera needs to be switched off and on automatically. The Magic Moments application provides a means to pause and resume the recording of serial pictures dynamically for the efficient use of memory and the duration of the newest 'n' images. This also helps the user as he can preserve images for a longer time interval with less memory. The idea behind the application is to capture some moments in the form of a 'series of newest 'n' still images during all circumstances where the camera is active and the user is able to get the serial newest 'n' still images at any instant during the entire active life of the camera. It allows the user to freeze the newest 'n' images at any instant of time and to go for next set of newest 'n' images without interruption of the camera viewfinder. It allows the user to change the time interval between images and number of images dynamically depending on the situation/the user's wish.

It will also be obvious to those skilled in the art that other control methods and apparatuses can be derived from the combinations of the various methods and apparatuses of the present invention as taught by the description and the accompanying drawings and these shall also be considered within the scope of the present invention. Further, description of such combinations and variations is therefore omitted above. It should also be noted that the host for storing the applications include but not limited to a microchip, microprocessor, handheld communication device, computer, rendering device or a multi function device.

Often, the user has initiated the camera application to perform a picture-taking activity, video-recording, etc., but sometimes there is a chance that he forgets to take a picture or forgets to record video and closes the camera (accidentally or voluntarily). But as the Magic Moments application serially records the newest 'n' still images during all circumstances when the camera is turned on, at any moment, the user is able to serially obtain the newest 'n' still images.

Often, the user is recording a particular event and later feels that the recording of the event is of less importance or may find that recorded video is occupying more memory and he is running out of memory, hence the user can replace a complete video with serial images and a serial images for the same event while recording a video. The images stored in such manner can also be transferred to other people.

Also, often the user is performing video telephony, IMS video sharing, etc., and wishes to store a series of still images. The Magic Moments application according to the present invention allows the user to capture serial still images with the specified number and the specified time interval between two still images adjacent to each other when the camera device is in use by any application such as picture-taking, video-Recording, video telephony, video-sharing, etc. Also, the Magic Moments application manages to continue capturing still images even if the user switches from one camera application to other camera applications. Also, the Magic Moments application provides the pause and resume functions of the serial capturing, which allows the user to use the memory efficiently.

Often when the user has started the camera to capture the serial still images, a VT call suddenly occurs. At this time, the user feels that the current newest 'n' still images available in the buffer are very important and wants the images for later reviewing, but does not want them to be overwritten while still carrying on with the VT immediately. In such situations the user can simply pause the Magic Moments application and later, when the call is finished, the user can continue capturing the serial still images or review the images available in the buffer before the VT call.

The application allows the user to freeze/select the newest 'n' images at any particular time instant for later reviewing and store in volatile memory or store permanently in nonvolatile memory such as flash, ROM, etc and continue to create a fresh set of newest 'n' images without breaking the continuity i.e. without blocking the view finder/stopping view finder, as long as the camera is turned on.

For example, when the user is watching a football match, or whenever he feels the moments he is viewing are important, he can freeze the newest 'n' images for later reviewing so as to store the newest 'n' images in volatile memory or store permanently the newest 'n' images in nonvolatile memory such as flash, ROM, etc., without breaking the continuity of the camera viewfinder.

Sometimes the user feels that the currently available still images in the buffer are very important to him, and the user wants to review the newest 'n' images available in the buffer, and also save the images of his choice. (Note that the user does not intend to take a picture.)

The user may suddenly witness an event of his interest and starts the camera to take a picture immediately. Luckily he finds the event on the viewfinder, but unfortunately the event that the user wants to capture has vanished before he could initiate the take picture activity.

The user may start the camera preview and after sometime, e.g., after few minutes may feel that the current moment is the right moment to take a picture. But unfortunately, if the battery drains suddenly at this instant, then picture-taking application is closed. Hence the user cannot take the picture, even though the moment to be captured is on the viewfinder, due to the low-battery. But as the Magic Moments application provides the newest 'n' still images, it is possible to have images of those moments.

The user starts the camera preview and takes a picture but does not obtain "good or quality" pictures due to various reasons such as improper focusing, a moving object, camera-shaking, etc., or the user may not be satisfied with the picture. It is impossible to go back in time, therefore the user misses important and precious moments. But as the Magic Moments application provides the newest 'n' still images in addition to the image taken by the user it is possible to get the images of missed events. The Magic Moments application also can be considered as "multi-shot in past" in order to get a best picture out of many.

When the user starts the camera preview and takes a picture, at the time of capture, some obstacle comes in front of the camera sensor.

Because of the obstacle, the user will not get a proper image. But if the user later feels that he should have taken images of those moments, it is impossible to go back in time, therefore the user misses important and precious moments. But as the Magic Moments application provides the newest 'n' still images in addition to the image taken by the user, it is possible to get the images of missed events, and therefore the user can select a best picture out of a number of images.

If the user starts the camera preview with an intention of taking a picture and forgets to take a picture or misses the right moment to take a picture, but he later feels that he should have taken images of those moments, it is impossible to go back in time, and the user misses important and precious moments. But as the Magic Moments application provides the newest 'n' still images at any point of time, it is possible to get the images of missed events even during a camera preview and without taking actual picture at any time. It is possible to get the newest 'n' still images any time as long as the camera is turned on and even multiple times if the camera is turned on.

If the user starts the camera preview and selects the multi-shot option to get next "m" images. The user may miss the right moment to start "multi-shot" capturing and therefore may not get the exact images he wanted. The Magic Moments application will be disabled automatically during the multi-shot and will be re-enabled after the multi-shot, therefore, the user will get the newest 'n' images previous to the multi-shot and next "m" images due to the multi-shot. It is possible to get the images of missed events and therefore the user can select a best picture out of "n+m" images.

Although the present invention has been fully described in connection with the preferred embodiments thereof with reference to the accompanying drawings, it is to be noted that various changes and modifications are possible and are apparent to those skilled in the art. Such changes and modifications are to be understood as included within the scope of the present invention as defined by the appended claims unless they depart there from.

What is claimed is:

1. A method for automatic image management in an imaging device, the method comprising the steps of:
   serially capturing and temporarily storing a predetermined number of still images in a camera application, wherein each still image is serially captured and stored in real time after a predetermined time interval;
   when one or more new still images are captured after the predetermined number of still images are temporarily stored, discarding one or more oldest still images and temporarily storing the one or more new still images; and
   storing the predetermined number of temporarily stored still images in a memory and creating a new buffer for continued serial capture and temporary storage of a fresh set of newest still images in real time, when a freeze request is generated;
   wherein the freeze request is generated when switching from the camera application to another application of the imaging device.

2. The method for automatic image management as claimed in claim 1, further comprising pausing the serially storing of still images if a pausing request is generated.

3. The method for automatic image management as claimed in claim 2, further comprising resuming the serially storing of still images if a resuming request is generated.

4. The method for automatic image management as claimed in claim 3, further comprising when any other camera application is activated, generating the pausing request, and when the activated camera application is deactivated, generating the resuming request.

5. The method for automatic image management as claimed in claim 1, wherein the temporarily stored still images are kept intact even when switching among camera applications is performed.

6. The method for automatic image management as claimed in claim 1, further comprising encoding the still images in a predetermined image format.

7. The method for automatic image management as claimed in claim 6, further comprising configuring the image format for storing the still images in response to a user input.

8. The method for automatic image management as claimed in claim 1, further comprising configuring the predetermined number of still images and the predetermined time interval according to a user input.

9. The method for automatic image management as claimed in claim 1, further comprising if a view request is generated, displaying still images temporarily stored prior to a time instant of the generation of the view request.

10. The method for automatic image management as claimed in claim 1, wherein a total amount of the still images to be temporarily stored is dynamically varied in response to a user configuration.

11. The method for automatic image management as claimed in claim 1, further comprising if a view request is generated, displaying all of the still images temporarily stored prior to a time instant of the generation of the view request and displaying all of the still images stored in the memory in response to the freeze request.

12. The method for automatic image management as claimed in claim 11, further comprising selecting, in response to a user input, a part of or all of the temporarily stored still images displayed in response to the view request.

13. The method for automatic image management as claimed in claim 1, wherein the temporarily stored predetermined number of still images is compressed and stored in the memory.

14. The method for automatic image management as claimed in claim 1, further comprising:
   capturing a plurality of still images in response to a multi-shot configuration if a multi-shot request is generated;
   providing, to a user, the plurality of still images captured in response to the multi-shot configuration and the predetermined number of still images temporarily stored prior to a time instant when the multi-shot request is generated.

15. The method for automatic image management as claimed in claim 1, further comprising if a terminating request is generated, normally storing, the predetermined number of still images temporarily stored prior to at a time instant when the terminating request is generated.

16. A system for automatic image management in an imaging device, comprising:
   a control unit serially capturing and temporarily storing a predetermined number of still images in a camera application, wherein each still image is serially captured and stored in real time after a predetermined time interval, the control unit discarding one or more oldest still images and temporarily storing one or more new still images when the one or more new still images are captured after the predetermined number of still images are stored so that the predetermined number of still images are newest still images being stored in real time, and the control unit storing the predetermined number of temporarily stored still images in a memory and creating a new buffer for continued serial capture and temporary storage of a fresh set of newest still images in real time, when a freeze request is generated; and
   a buffer temporarily storing the predetermined number of still images under a control of the control unit;
   wherein the freeze request is generated when switching from the camera application to another application of the imaging device.

17. The system for automatic image management as claimed in claim 16, further comprising an image-processing unit processing still images to be stored in the buffer.

18. The system for automatic image management as claimed in claim 16, further comprising an image encoder encoding still images to be stored in the buffer in a format set by a user.

19. The system for automatic image management as claimed in claim 16, wherein if a pausing request is generated, the control unit pauses the serially storing and if a resuming request is generated after the pausing, resuming the serially storing of still images.

20. The system for automatic image management as claimed in claim 16, further comprising a means for compressing still images temporarily stored.

21. The system for automatic image management as claimed in claim 16, wherein if a multi-shot request is generated, the control unit capturing a plurality of still images in response to a multi-shot configuration and providing, to a user, the plurality of still images captured in response to the multi-shot configuration and the predetermined number of still images temporarily stored prior to at a time instant when the multi-shot request is generated.

* * * * *